United States Patent [19]

Sheeline

[11] 4,119,560

[45] Oct. 10, 1978

[54] METHOD OF TREATING RADIOACTIVE WASTE

[75] Inventor: Randall D. Sheeline, San Jose, Calif.

[73] Assignee: United Technologies Corporation, Hartford, Conn.

[21] Appl. No.: 781,893

[22] Filed: Mar. 28, 1977

[51] Int. Cl.[2] .......................... C09K 3/00; C09K 11/04

[52] U.S. Cl. ....................... 252/301.1 W; 159/47 WL; 159/DIG. 12; 427/5; 427/220; 427/221

[58] Field of Search .................... 427/5, 212, 220, 221, 427/222; 159/47 WL, DIG. 12; 252/301.1 W

[56] References Cited

U.S. PATENT DOCUMENTS

| | | | |
|---|---|---|---|
| 1,997,980 | 4/1935 | Smith | 23/177 |
| 2,182,428 | 12/1939 | Fladmark | 159/48 |
| 2,417,131 | 3/1947 | Schmitt | 202/70 |
| 3,022,149 | 2/1962 | Cramer | 149/19 |
| 3,236,747 | 2/1966 | Margiloff | 203/11 |
| 3,463,738 | 8/1969 | Fitzgerald et al. | 252/301.1 W |
| 3,544,360 | 12/1970 | Gardner | 427/212 |
| 3,734,160 | 5/1973 | Osdor | 159/47 R |
| 3,822,251 | 7/1974 | Vrolyk et al. | 260/239 |
| 3,891,496 | 6/1975 | Erwin | 159/47 R |
| 3,935,339 | 1/1976 | Cooke | 427/212 X |
| 3,954,526 | 5/1976 | Mangum et al. | 427/221 X |
| 4,009,116 | 2/1977 | Bahr et al. | 252/301.1 W |
| 4,021,363 | 5/1977 | Standart et al. | 252/301.1 W |
| 4,039,468 | 8/1977 | Humblet et al. | 252/301.1 W |
| 4,043,875 | 8/1977 | Rajakovics et al. | 252/301.1 W X |

OTHER PUBLICATIONS

*Quickmix,* Chemical Engineering Progress, Feb., 1965.
Concentration of Aqueous Radioactive Waste; C.E.P. Apr. 1976, pp. 63 & 64.
Treatment and Disposal of Radioactive Wastes, Burns, Chemical & Process Engineering, Jan. 1961, pp. 15–19.

*Primary Examiner*—Ralph S. Kendall
*Assistant Examiner*—Shrive P. Beck
*Attorney, Agent, or Firm*—Steven F. Stone

[57] ABSTRACT

An inert carrier process for drying radioactive waste material and for incorporating the dry material into a binder from which the dried material will not be leached is disclosed. In this process, a hot inert liquid carrier is provided into which the solution to be dried is introduced under extremely turbulent conditions. The solvent flashes off leaving the dried particles dispersed in the inert carrier which carries these particles to a mixing station where a binder for the particles is injected under turbulent conditions. The binder preferentially wets the particles and the coated particles are carried to a separator section where the binder coated particles coalesce and separate from the carrier as a second phase. Thereafter a curing agent can be added to the binder.

12 Claims, 1 Drawing Figure

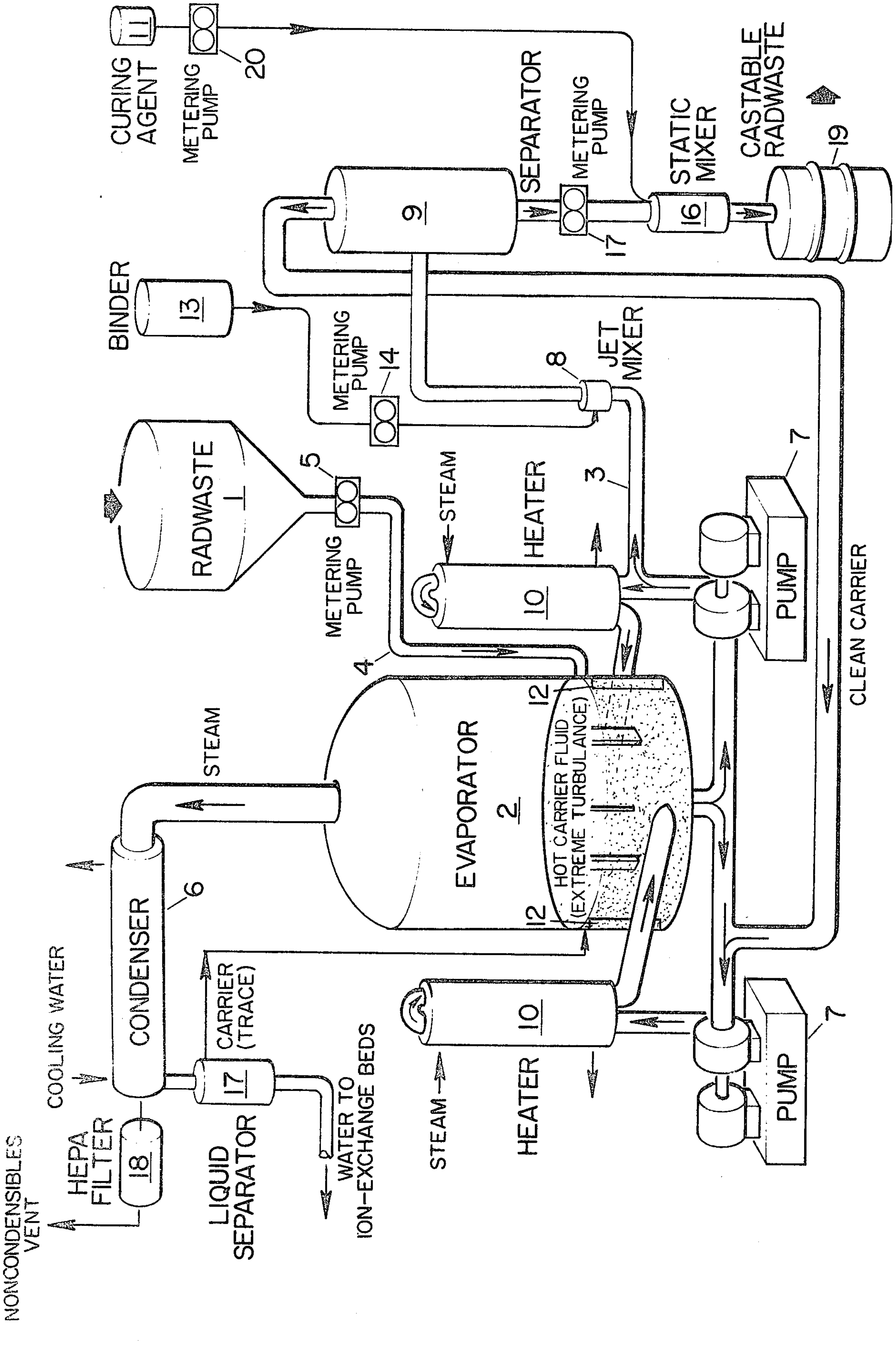
CURING AGENT
11
METERING PUMP
20
SEPARATOR
9
METERING PUMP
17
STATIC MIXER
16
CASTABLE RADWASTE
19
BINDER
13
METERING PUMP
14
8
JET MIXER
RADWASTE
1
5
METERING PUMP
STEAM
HEATER
3
10
7
PUMP
CLEAN CARRIER
4
12
EVAPORATOR
2
HOT CARRIER FLUID (EXTREME TURBULANCE)
STEAM
CONDENSER
6
COOLING WATER
CARRIER (TRACE)
17
HEATER
10
STEAM
PUMP
7
HEPA FILTER
18
LIQUID SEPARATOR
WATER TO ION-EXCHANGE BEDS
NONCONDENSIBLES VENT

METHOD OF TREATING RADIOACTIVE WASTE

BACKGROUND OF THE INVENTION

The operation of nuclear reactor power plants produces substantial quantities of low level radioactive wastes. For disposal, these wastes must be solidified.

The main sources of these wastes are:

a. Spent ion-exchange resins used to maintain an extremely high degree of purity in the water used in the BWR (Boiling Water Reactor). These resins are in the form of small beads and are delivered for solidification wet with about an equal weight of water.

b. Dilute sodium sulfate solution, contaminated with some radioactive nuclides, which is the result of the ion-exchange resin regeneration process.

c. Powdered ion-exchange resins, called Powdex, are coated onto a filter and used as an ion-exchange bed. The contaminated Powdex is delivered wet with water for solidification.

d. Filter pre-coats, such as diatomaceous earth, Cellulite and Solka-floc, become contaminated and are also delivered water-wet for solidification.

e. Boric acid solution recirculates through the PWR (Pressurized Water Reactor) and contaminated boric acid solution is removed for solidification and burial.

f. Cleanup solutions from floor scrubbings and from decontamination of equipment. These contain detergents, oxalic acid, phosphoric acid, potassium permanganate, potassium hydroxide and sodium hydroxide.

In current technology the solutions are concentrated in evaporators. The sodium sulfate can be brought to 20% solids and the boric acid to 12% solids in conventional evaporators. Any attempt to go to higher solids concentration results in serious scaling and corrosion. With a forced circulation titanium-tubed evaporator it is sometimes feasible to take the sodium sulfate to 25% solids. The evaporator bottoms, water-wet resins and filter-aids are mixed with portland cement or urea-formaldehyde (U-F) for solidification. This increases the volume by about 1.6 times. Much of the cement or U-F resin is used to solidify the water.

The cost of burying these solidified wastes currently is about $25/ft^3$. If the water could be removed before solidification, significant savings could be achieved.

The sodium sulfate forms the largest portion of the radioactive waste and provides a good example of the economics involved. Ten cubic feet of 20% sodium sulfate solution forms 16 cu ft of solidified radwaste when it is mixed with cement or U-F resin.

The 10 cu ft of 20% sodium sulfate solution contains 135 lbs of dry sodium sulfate. The bulk density of powdered sodium sulfate is approximately 100 lb/cu ft. When mixed with 35% of a binder the volume increases only 10% as most of the binder fills the interstices. Consequently, the 135 lbs of dry sodium sulfate, when mixed with 35% binder has a volume of 1.5 cu ft, slightly better than a 10:1 volume reduction when compared to U-F or cement solidification.

Several methods to reduce volume are being practiced today. One example is to calcine the materials to form solid granules. A second is to mix the materials into hot asphalt. All of these systems have their advantages and disadvantages but to date there has been developed no system which can solidify these low level nuclear wastes in a simple, low-cost, low-volume manner. According to this invention, however, such a system has been provided.

It is accordingly an object of this invention to provide a system for the continuous drying and the coating of the dried product.

Another object of this invention is to provide a coated and castable mixture having a low leach rate.

Another object of this invention is to provide an evaporating system which produces no scale.

These and other objects of this invention will be readily apparent from the following description with reference to the accompanying drawing wherein:

The FIGURE is a schematic flow diagram of a system according to this invention.

DESCRIPTION OF THE INVENTION

According to this invention, a system is provided wherein a solution (which term includes both true solutions as well as dispersions) of liquid solvent and a solid solute is introduced into a hot inert carrier to cause the solvent to flash leaving dried solute in the inert carrier in the form of dispersed solid particles. The inert carrier carrying the particles then flows to a second station where a binder for the particles is introduced to coat the particles by preferential wetting and then the coated particles coalesce so they can be readily separated from the inert carrier by gravity in a separation stage. As used herein the terms "preferential wetting" or "preferentially wetted" describe that condition which exists when the solid particles have a greater affinity to be wetted by the liquid binder than by the inert carrier. The existence of this condition is readily determinable since the liquid binder can actually be observed to displace the inert carrier as it flows around and coats the solid particle. Further, if this condition does not exist the process of this invention does not function in that the particles do not get coated and the result is a suspension of binder in the carrier and a suspension of particles in the carrier. In general, preferential wetting will usually exist when the carrier is non-polar and the binder and particles are polar or vice-versa, for example, although this may not be 100% predictable. The existence of the condition in specific systems can be verified by placing the materials in a Teflon ® or other non-sticking container at the operating conditions and shaking. If coalescing occurs as a separate phase, preferential wetting exists. This invention is useful whenever it is necessary to remove the solvent from a solution and/or encapsulate the dried, solid solute and in its most general application the following criteria must be met:

1. The solid solute should be insoluble in and non-reactive with the inert carrier.

2. The binder should be insoluble in and non-reactive with the inert carrier so that it is capable of forming a separate phase in the carrier.

3. The binder should be a liquid at the operating condition but capable of solidifying, either thermoplastically or through a chemical reaction, upon removal from the system.

4. The inert carrier should be a liquid with a relatively low vapor pressure to permit its continued re-use without extensive recovery operations.

5. The particles should be preferentially wetted by the binder.

Thus, while the system of this invention has uses in many applications, it will be described hereinafter with respect to the concentration of aqueous sodium sulfate, it being recognized that the sodium sulfate solution is exemplary rather than limiting and that the scope of this invention is defined solely by the appended claims.

Referring now to the FIGURE, the system comprises a source of the solution to be dried 1 which feeds to the evaporator 2 through line 4 fed by a metering pump 5. The evaporator 2 terminates at one end in a condenser 6 and at the other end is connected to pumps 7 which circulate the inert carrier contained in the evaporator system through heat exchangers 10 and back to evaporator 2. Condenser 6 can be vented to the atmosphere directly with the condensate returned to the ion-exchange beds. If further treatment is needed, primarily for environmental purposes, the gas from the condenser can be vented to the atmosphere through a HEPA filter 18 and the condensate can be passed through a liquid separator 17 to remove any residual traces of inert carrier which can then be recycled back to evaporator 2. A side stream 3 from one of the pumps 7 circulates the slurry contained in the evaporator 2 through jet mixer 8 and separator 9 back to the inlet of the other pump 7. The inert carrier is injected at high velocities into the evaporator which may be provided with baffles 12 or other turbulence increasing means to maintain the fluid in the evaporator in a highly turbulent condition. As used herein the term "highly turbulent condition" refers to a condition of turbulence in the evaporator 2 such that when the feed solution is introduced into the hot inert carrier an explosive flashing of vapor does not occur. This condition can be readily determined for any specific system by experimentation since when explosive flashing occurs it is quite apparent, being accompanied by both noise and excessive splattering and splashing of the solvent, the solute and the carrier. This causes carry-over of particles and droplets with the vapor generated. This condition subsides as turbulence is increased until it is finally replaced with quiet generation of vapor as small bubbles which act to scrub particulate matter from the vapor. This minimum level of turbulance must be maintained according to this invention. The evaporator is also designed so that the flow pattern and dwell time is such that all vapor generation occurs in the evaporator before the carrier flows to pump 7. The system of the invention also includes a source of a binder 13 which feeds by a metering pump 14 into jet mixer 8 wherein the binder is mixed with the inert carrier carrying the dried particulate solute under conditions of extreme turbulence. The binder may be any suitable polymeric material or cemetitious material such a polyethylene, polypropylene, polystyrene, phenolics, cellulosics, epoxys, polyesters, acrylonitrile-butadiene-styrene (ABS), urea-formaldehydes, and others. The general characteristics of the binder are that it be relatively fluid at the temperatures of the process, be capable of encapsulating the particulate material by preferential wetting and be capable of hardening into a solid mass on curing or on cooling to ambient conditions. For special uses where resistance to water solubility is important, such as in connection with radioactive waste disposal, the binder should also be resistant to subsequent leaching of the particulate material from the end product. Thermoplastic type polymers are usable as are thermosetting polymers. In the latter case the introduction of the curing agent into the finished product is necessary, preferably accomplished after removal from the inert carrier in order to avoid the possibility of the polymer curing within the system. In the FIGURE, curing agent 11 is metered by pump 20 into static mixer 16 where it mixes with the product fed from metering pump 17 and then enters the castable radwaste container 9 where it solidifies. The entire system comprising the evaporator, the pumps, the jet mixer, the separators, the heat exchangers and the associated conduits are preferably Teflon ® lined or coated to reduce the tendency of any of the materials to stick to the internal surfaces through which the inert carrier circulates. Since it is apparent from the drawings that the liquid in the feed solution never enters the heat exchangers the problem of scale buildup within the system is eliminated.

For drying and coating aqueous solutions such high boiling liquids as parafinic hydrocarbons, silicone fluids, phthalates, commercial heat transfer fluids such as Therminol or Dowtherm, high molecular weight alcohols, high temperature liquid polymers and others are suitable carriers and the previously listed polymers are suitable binders. This list is merely exemplary since an almost infinite combination of materials can be employed according to this invention within the selection criteria set out above.

In a typical system the dried and coated end product may be between 65 and 75% particulate material such as sodium sulfate and 35 to 25% binder. The actual composition for any particular system may vary greatly.

It has been found that as the particle size of the particulate material is increased a higher solids loading can generally be obtained. The particle size distribution can be controlled by appropriate selection of the temperature of the evaporator, with higher temperatures yielding generally smaller particles and lower temperatures yielding generally larger particles. Another factor affecting particle size is average residence time of crystals in the evaporator. With longer residence times the recirculating particles contact fresh droplets of solution and can grow. The residence time of a crystal is inversely proportioned to the flow rate through side stream 3.

Having thus generally described the system, the following specific example describes a preferred embodiment of the system used to reduce aqueous sodium sulfate solution to castable anhydrous particles coated with an epoxy resin using a silicone oil as the inert carrier.

EXAMPLE I

An inert carrier drying and coating system was designed to process 1 gallon per minute of 20 percent aqueous sodium sulfate radwaste solution employing a dimethyl silicone oil as the inert carrier and a glycidyl ether, such as Shell Chemical Company's Epon ® as the binder. Hexahydrophthalic anhydride is used as the curing agent. The product cures in 3 hours at 300° F. The system was designed with a nominal operating temperature in the evaporator of 300° F. The inert carrier is recirculated through the heat exchangers at a high rate of approximately 125 gallons per minute and the temperature is increased to 320° F. by 150 psi steam flowing through the heat exchanger. In the processing of the 20% sodium sulfate solution at a rate of 60 gallons per hour (120 lbs./hour $Na_2SO_4$ and 470 lbs./hour $H_2O$), binder is fed into the inert carrier through the jet mixer at the rate of 34.2 lbs. per hour and the coated particles removed in the separator. The epoxy resin used in a solid at ambient temperatures and liquid at the 300° F. operating temperature of the system. It forms a thermoplastic solid mass of sodium sulfate encapsulated in epoxy resin upon removal from the separator and cooling. The same resin system can be formed into a permanent solid by the addition of 5.8 pounds per hour of curing agent and maintaining the removed product at 300° F. for 3 hours. This produces approximately 1.2 ft.$^3$ per hour of cured, dried, coated 75% $Na_2SO_4$. This cured product is stable at temperatures far higher than 300° F. and significantly enhances the inherently low leach rate of the system. A comparison of the coated product with a conventional sodium sulfate-cement mixture shows a leach rate 3% of the cement leach rate.

The above description is provided as illustrative of the invention rather than limiting thereof and various modifications will suggest themselves to workers skilled in the art. For example the addition of fire proofing agents or wetting agents or plasticizers into the system can be used to impart any desired chemical or physical characteristics to the materials.

These and other modifications can be made without departing from the scope of this invention which is limited only by the following claims wherein I claim:

1. A process for reducing the volume of aqueous radwaste solutions of solid radioactive materials which process comprises:

a. continuously circulating an inert carrier liquid between an evaporator station and a separator station;

b. introducing said radwaste solution into said inert carrier at said evaporator station under highly turbulent conditions and at a temperature sufficiently above that of the boiling point of said radwaste solution to cause said radwaste solution to flash vaporize under nonexplosive conditions leaving said radioactive material in a dry particulate form dispersed within said inert carrier;

c. introducing a binder material into said inert carrier and dried radioactive material at a mixer station between the evaporator station and the separator station, said binder material being:

a. liquid at the temperature of said inert carrier and capable of solidifying upon removal therefrom, b. insoluble in said inert carrier, and c. capable of preferentially wetting said dried particulate solid material;

whereby said binder will coat said radioactive material in said carrier; and d. separating said coated particulate material from said carrier at said separator station.

2. The process of claim 1 wherein said inert carrier is circulated to a heater station located downstream from said evaporator station at a point where substantially all of said water has been removed from said carrier whereby the build-up of boiler scale and other undesirable deposits within said heater is prevented.

3. The process of claim 1 wherein said inert carrier is silicone oil, said radwaste is an aqueous solution of sodium sulfate and said binder is an epoxy resin.

4. The process of claim 3 wherein a curing agent for said epoxy resin is added to said coated particulate material after removal from said separator station.

5. The process of claim 4 wherein said inert carrier is circulated to a heater station located downstream from said evaporator station at a point where substantially all of said water has been removed from said carrier whereby the build-up of boiler scale and other undesirable deposits within said heater is prevented.

6. The process of claim 1 wherein said radwaste solution consists of a suspension of radioactive material in water.

7. The process of claim 1 wherein said radwaste solution consists of a true aqueous solution of radwaste in water.

8. The process of claim 1 wherein said binder is a thermoplastic material.

9. The process of claim 1 wherein said binder is a thermosetting material and a curing agent for said thermosetting material is introduced into said coated solid particulate material after removal from said separator.

10. A process for the volume reduction of aqueous radwaste solutions of radioactive sodium sulfate which comprises:

a. circulating a silicone oil carrier liquid between an evaporator station and a separator station;

b. introducing said radwaste solution into said silicone oil at said evaporator station under highly turbulent conditions and at temperatures at least about 300° F. whereby said water is caused to flash vaporize under nonexplosive conditions leaving said sodium sulfate in a dry particulate form dispersed within said silicone oil;

c. introducing an epoxy resin into said silicone oil and dried sodium sulfate at a mixer station between the evaporator station and the separator station; and d. separating said coated sodium sulfate from said silicone oil at said separator station.

11. The process of claim 10 wherein a curing agent for said epoxy resin is added to said coated sodium after removal from said separator and said mixture is permitted to cure.

12. The process of claim 10 wherein said silicone oil is circulated through a heater station at a point downstream of said evaporator where substantially all of the water has been removed from the silicone oil whereby build-up of boiler scale and other undersirable deposits is prevented.

* * * * *